United States Patent
Peckels

[19]

[11] Patent Number: 6,123,225
[45] Date of Patent: Sep. 26, 2000

[54] METHOD AND APPARATUS FOR POURING LIQUID FROM A BOTTLE

[76] Inventor: Arganious E. Peckels, 1376 Hickory St., Ogilive, Minn. 56358-3653

[21] Appl. No.: 09/411,941

[22] Filed: Oct. 4, 1999

Related U.S. Application Data

[62] Division of application No. 08/752,202, Nov. 19, 1996, Pat. No. 5,961,008.

[51] Int. Cl.⁷ .................................................. B65D 25/48
[52] U.S. Cl. .............................. 222/1; 222/477; 222/482; 222/569
[58] Field of Search .............................. 222/1, 477, 479, 222/500, 569, 482

[56] References Cited

U.S. PATENT DOCUMENTS

| | | | |
|---|---|---|---|
| 973,616 | 10/1910 | Beck | 222/479 X |
| 1,022,443 | 4/1912 | Send | 222/500 |
| 1,745,011 | 1/1930 | Frejacques | 222/479 X |
| 2,620,947 | 12/1952 | Kucki | 222/477 X |
| 2,785,839 | 3/1957 | Pree | 222/479 |
| 2,847,042 | 8/1958 | Edelmann | 222/479 X |
| 2,968,423 | 1/1961 | Mahler et al. | 222/500 X |
| 3,233,797 | 2/1966 | Conry | 222/477 |
| 3,321,113 | 5/1967 | Conry | 222/477 |
| 3,543,964 | 12/1970 | Schlossmacher | 222/477 X |
| 4,243,157 | 1/1981 | Rettberg | 222/500 X |
| 5,044,521 | 9/1991 | Peckels | 222/477 X |
| 5,503,306 | 4/1996 | Knickerbocker | 222/321.1 |

*Primary Examiner*—Kenneth Bomberg
*Attorney, Agent, or Firm*—D. L. Tschida

[57] ABSTRACT

A liquid pourer for pouring liquid from a bottle, most likely liquor, has a new sealing cork enabling much easier insertion and extraction of the pourer into and out of a bottle, a new cork and collar combination enabling similar easier insertion and extraction, and a new dump cap for portion control pouring wherein a new assembly and sealing method and structure is provided, and numerous new improvements making the pourer provide higher quality pouring.

11 Claims, 7 Drawing Sheets

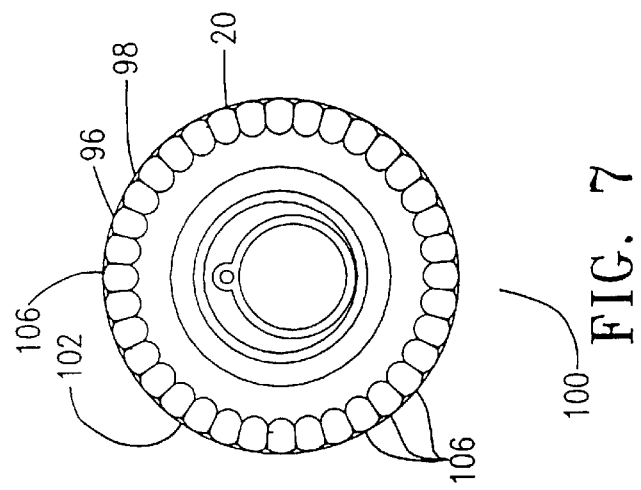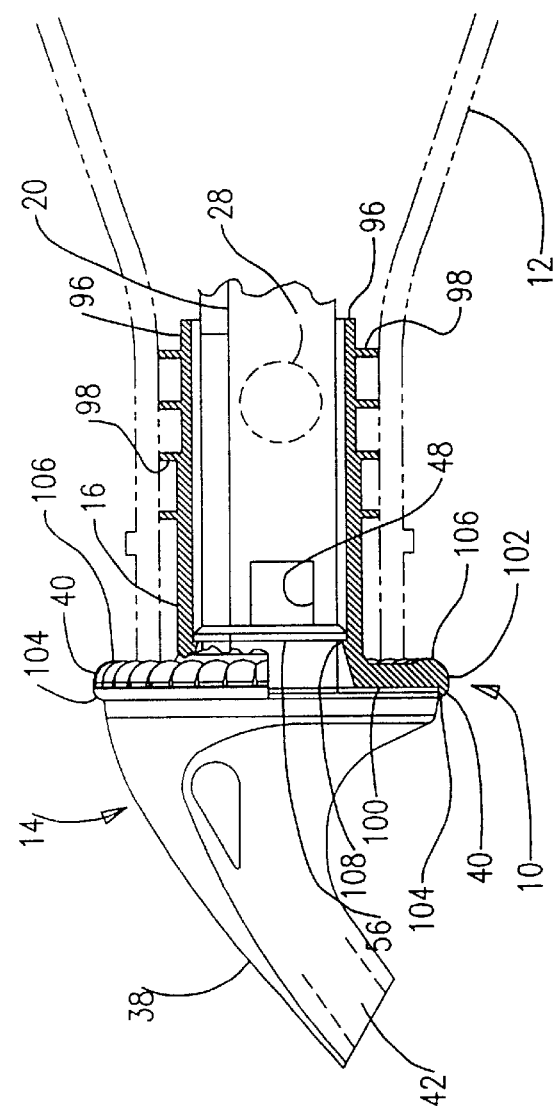

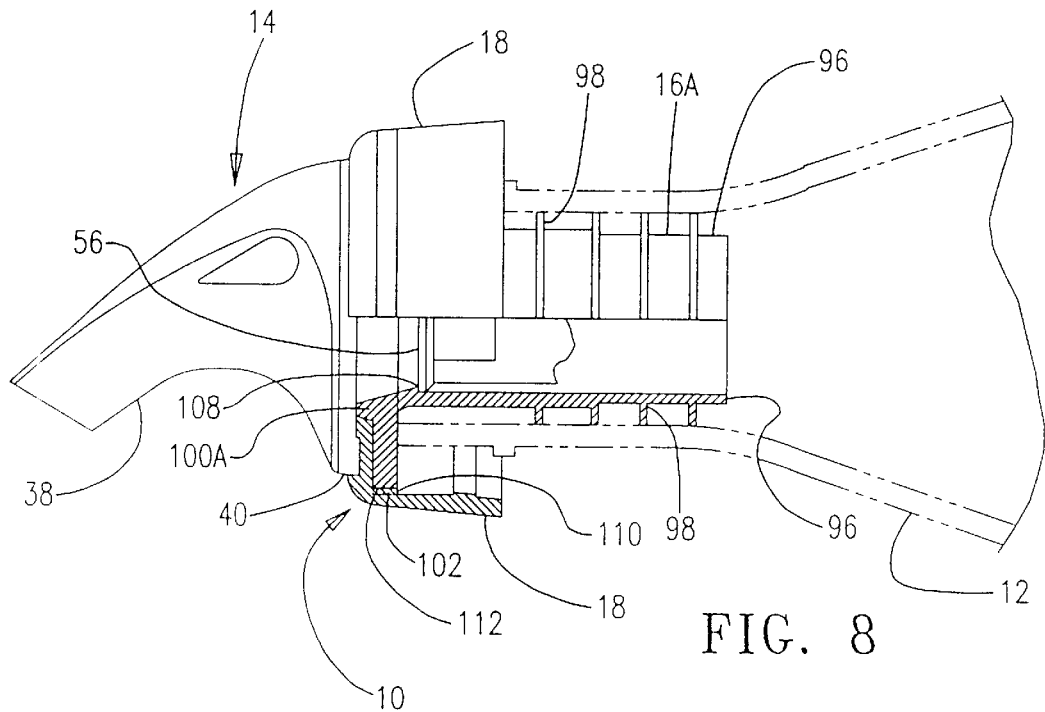
FIG. 8
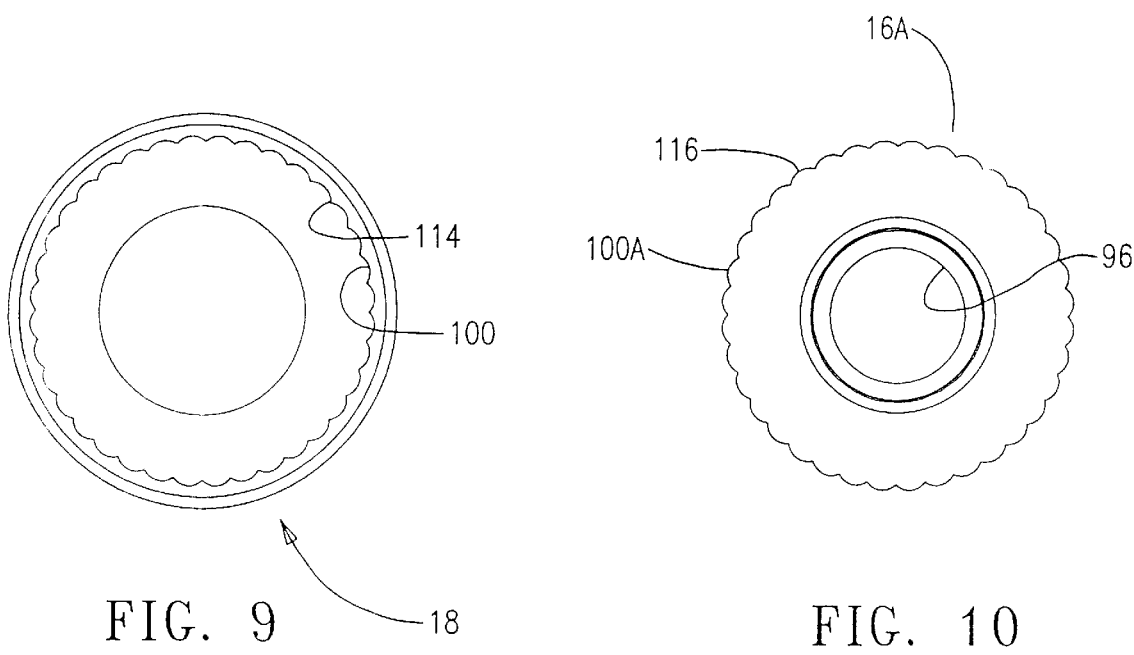
FIG. 9
FIG. 10

METHOD AND APPARATUS FOR POURING LIQUID FROM A BOTTLE

RELATED APPLICATIONS

This is a divisional application of Ser. No. 08/752,202, Nov. 19, 1996, U.S. Pat. No. 5,961,008.

BACKGROUND OF THE INVENTION

1. Field of the Invention

This invention pertains to a method and an apparatus for pouring liquid from a vessel, more particularly to a pouring head for pouring alcoholic beverages from individual bottles such as frequently seen in bars, night clubs, and restaurants.

2. The Prior Art

The prior art in pouring heads for pouring from bottles is exemplified by the following:

U.S. Pat. No. 3,321,113 Conroy 5/67

U.S. Pat. No. 3,630,419

This prior art, both in documental patent form and in commercial embodiment, has been the subject of various shortcomings. The pertinent prior art is characterized in having a pouring spout using at least one of normally two metal balls to provide a hydraulically controlled shut-off of the dispense pour for giving a predetermined quantity of liquid per pour. A specific example is a one (1) ounce pour which is routinely referred to as a "shot."

The prior art has a history of erratic variation in poured quantity between successive pours, a history of delivering frequent or occasional "short-shots", and a history of structural and breakage problems.

These pourers typically have a body with a front spout and a rear inlet pipe, a ball valve in the inlet pipe, a dump cap secured to the back end of the inlet pipe, a latch ball in the dump cap, and a cork to secure the pourer in the mouth of a beverage bottle. The beverage bottle is normally upright and is inverted over a glass to pour a unit of beverage into the glass. The body and dump cap usually have an air vent pipe for allowing air into the bottle. Frequently the spout outlet is covered by a normally closed flap to prevent insect egress and evaporation of liquid product. Among the specific problems of these pourers are the following:

Firstly, the corks are used solely to seal the body to the bottle, and hold the pourer in the bottle. In order to extract a pourer from the bottle, the spout of the pourer is grasped and pulled. Some pourers are provided with collars that go over the bottle neck in which case the collar is grasped and pulled. In both instances the inlet pipe is frequently stretched, cracked, bent or broken, usually at the liquid ports which are usually inside the collar and the weakest structure of the pourer. There is no way to apply a torque or pull to the collar other than firstly applying the torque or pull to the spout. When any stretching, cracking, bending, or breaking occurs, the pourer is functionally destroyed. The prior art pourers have also been difficult to remove, particularly for smaller people, and have been fingernail breakers and finger cutters.

Within the function and structure of the pourers, the dump cap has historically been a problem. Firstly the existing art is to injection mold the body and the dump cap of the same or similar plastics, and solvent weld them together with a solvent such as MEK, or to sonic weld them together. There has historically been problems with solvent overflow, not enough solvent, too much solvent, melt overflow from sonic welding, air and/or liquid leakage in the joints, incomplete bonding or welding, and breakage of the dump cap. The solvent or sonic welded area has been vulnerable to subsequent attack by alcohol and the relatively exotic trace chemicals in liquor. Subsequent stress cracking is well known. Further, the typical dump cap has used a four finger molded retainer to capture the latch ball valve. The four fingered ball valve retainer is not 100% reliable, and when bottle and pourer are slammed back down upon a counter the latch ball valves have fallen out and into the bottle of beverage. There has been litigation wherein such a fallen out latch ball valve was served to a consumer in purchased beverage, probably poured after the broken pourer was removed from the bottle. It has also become known to applicant that one of the many reasons for short-shot pours, is that the latch ball valve has had an implied angle of ninety (90°) degrees, has been in a relatively hard and rigid plastic material, and that the latch ball valve is not properly and immediately seating, but rather is jumping around on and off of the latch valve seat in the dump cap. Further yet it has been found that the shut-off ball valve is sticking to its seat in the dump cap and is never falling and therefore the pourer never shuts-ff. It has also been found that any one of the four fingers jointly holding the latch ball valve may break off, and the pourer is destroyed.

It has also been found that control of the ball shut-off valve in the body has been erratic. The causes have been found to be erratic fluid sealing of the ball to the base of the inlet pipe.

Further, prior structure has required hand labor intensive assembly processes relying upon the discretion and repetitive capabilities of assemblers. Quality has been erratic and defects excessive.

The methods and structure for admission of air into the bottle as liquid is poured out have been found to be too variable, and the cause of variation in shot size. Most prior art has an always open air pipe. One example of prior art has a solenoid controlled air valve.

The prior flapper valves on the spout outlet have also caused problems, sticking either open or closed, and occasionally interfering with flow out of the spout.

It has also been fount that because of the control or latch valve seat, the pourer has to be tilted at least forty-five (45°) degrees or one half of the included angle of the valve seat before the control valve will positively operate, if the valve does not properly close the pourer will short shot.

OBJECTS OF THE INVENTION

It is an object of the invention to provide a new and improved liquid pouring apparatus and components therefore, and methods of operation and provision thereof.

If is an object of this invention to provide an improved liquid pouring head having an improved mechanical mechanism for automatic shut off.

It is an object of this invention to provide an improved liquid pouring head having an improved dump cap and assembly of the cap to the pourer body.

It is an object of this invention to provide an liquid pouring head having a new and improved air flow control.

It is an object of this invention to provide a liquid pouring head having improved method and structure for removal of the head from a beverage bottle.

It is an object of this invention to provide a new cork per se, as well as a new combination of a cork and collar for easier injection and extraction of a pourer into and out of a bottle.

It is an object of this invention to provide several new improvements in ball valve control structure and function in a pouring head.

SUMMARY OF THE INVENTION

A method of installing and extracting a pourer from a bottle has the steps of providing a sealing cork with an annular flange of larger diameter than the pouring spout and grasping the cork flange to twist and pull the pourer out of the bottle.

A method of installing and extracting a pourer to and from a bottle, wherein the pourer has a collar, has the steps of providing a splined radial connection between the collar and a sealing cork, and twisting the collar in or out of the bottle with the collar.

A method of providing a liquid pourer for pouring liquid from a bottle has the steps of providing a pourer body, providing a pourer dump cap, and assembling and sealing and retaining the cap to the body with mechanical retainer and without the use of solvent, adhesive, sealant or welding.

A liquid pourer for pouring liquid from a bottle has a body, a tubular cork, and an annular ring on the cork with a perimeter larger than the body, enabling grasping of the ring and extraction of the pourer by the cork.

A liquid pourer for pouring liquid from a bottle has a body, a cork, and a collar; the cork and collar are radially splined to each other enabling the collar to turn the cork in the bottle during extraction of the pourer.

A liquid pourer for pouring liquid from a bottle has a body, a dump cap, and connecting means for mechanically connecting the cap to the body without solvent or adhesive.

A liquid pourer for pouring liquid from a bottle has a body, a dump cap, a shut-off valve with the body, and a liquid sump around a normally open valve support.

A liquid pourer for pouring liquid from a bottle has a body, a dump cap, a shut-off valve in the body, a control valve in the dump cap, and a control valve seat having an included angle of less than ninety (90°) degrees, A liquid pourer for pouring liquid from a bottle has a body, a dump cap, a shut-off valve in the body, a control valve in the dump cap, and a control valve retainer on a distal end of the valve cap, the control valve retainer is a circumfrentially complete tube with a plurality of inward extending abutments through which the control valve has been pressed.

A liquid pourer for pouring liquid from an inverted bottle has a body with a liquid bore and an air pipe, within the air pipe is a normally open control valve for controlling air pressure inside the bottle during pouring.

A liquid pourer for pouring liquid from an inverted bottle has a body with a pouring spout, a normally closed flap over an outlet of the pouring spout, and a thumb actuator on the flap for manually opening the flap while inverting the pourer and bottle.

A new cork per se for a liquid pourer has a relatively larger annular ring with grasping knobs enabling direct grasping and turning and pulling of the cork for insertion and/or extraction of the pourer without structural loading of the body.

A new cork and collar combination has the collar splined to the cork, enabling turning of the cork in the bottle during insertion and/or extraction of the pourer.

A new dump cap per se is of relatively soft pliable material, and has integral sealing assembly structure enabling subsequent assembly without solvent, adhesive, sealant or welding.

Other aspects of prior problems, objectives of the invention and manifestations of the invention will become known upon the knowledge and use of the invention.

DESCRIPTION OF THE DRAWINGS

FIG. 6 is a detail side section of the cork;

FIG. 7 is a back end view of FIG. 6;

FIG. 8 is a detail side section of the cork and collar combinations;

FIG. 9 is an underside view of the collar; and

FIG. 10 is a top view of the cork for the collar in FIGS. 8 & 9.

DESCRIPTION OF THE PREFERRED EMBODIMENT

Figure 1:
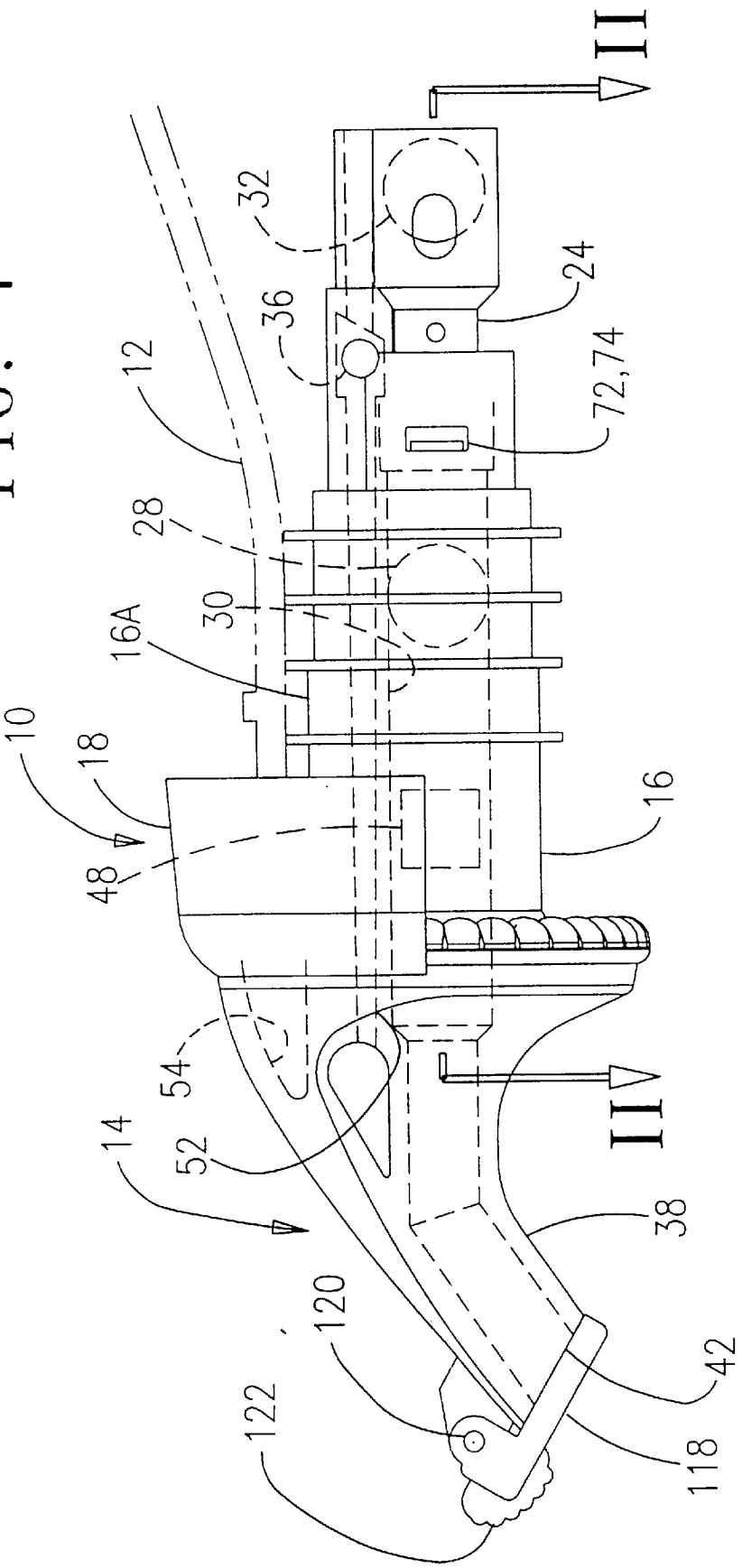
FIG. 1 is a side view of the preferred embodiment of the liquid pourer of this invention.

FIGS. 1–10 show the preferred embodiment of this invention. In FIG. 1, a liquid pouring head is generally identified by the numeral 10. This head 10 is specifically for pouring liquid, usually alcoholic beverage, out of a bottle 12. The bottle 12 is typically a one quart or one liter size. The adjoining head 10 and bottle 12 normally sit upright on a counter or bottle rack and are jointly inverted to pour a unit of liquid from the bottle 12.

The head 10 includes a main body 14 injection molded of a relatively rigid plastic, and a sealing cork 16, 16A, an optional collar 18 which is combined within the optional collar 16A.

The body 14 has a liquid inlet pipe 20 and an air vent pipe 22. A dump cap 24 is secured to a rear distal end 26 of the inlet pipe 20 and air pipe 22 and retains a shut-off ball valve 28 in a liquid bore 30 of the body 14. The dump cap 24 also contains a function control ball valve 32. The dump cap 24 provides an air valve chamber 34 for an air control ball valve 36.

The body 14, has a front or top pouring spout 38 with a diametric outer perimeter 40, and a liquid outlet 42. Behind the spout 38 is the inlet pipe 20 and the air pipe 22, the inlet pipe 20 has its distal end 26 and the liquid bore 30, which includes a precision valve bore 44, an enlarged valve pocket 46, liquid ports 48 into the liquid bore 30, and a shut-off valve seat 50, leading outward to the spout outlet 42. The air pipe 22 has an air inlet 52 in the pour spout 38. The spout 38 has an internal top cavity 54 in which a label or a function light may be placed. Just rearward of the pour spout 38 is a cork retainer 56 which extends around the liquid inlet pipe 20 and the air pipe 22.

Figure 2:
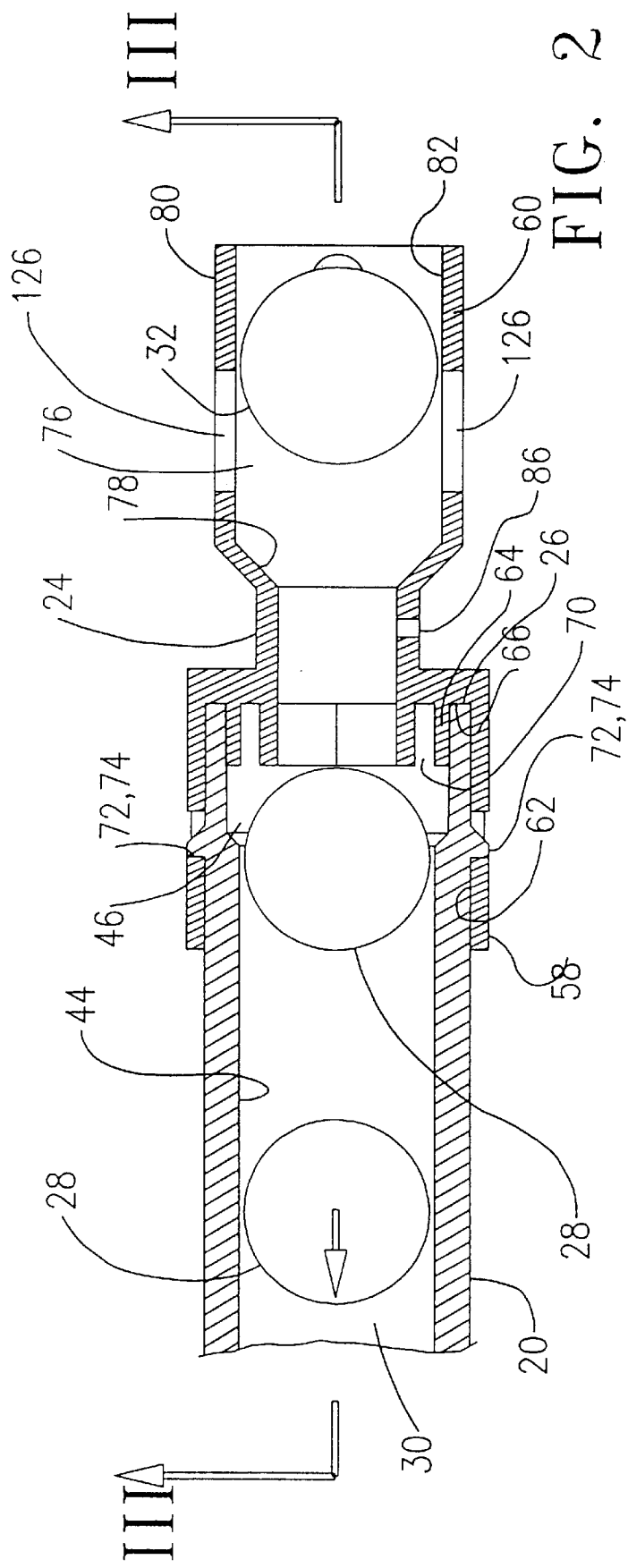
FIG. 2 is a section through lines II—II of FIG. 1.
Figure 3:
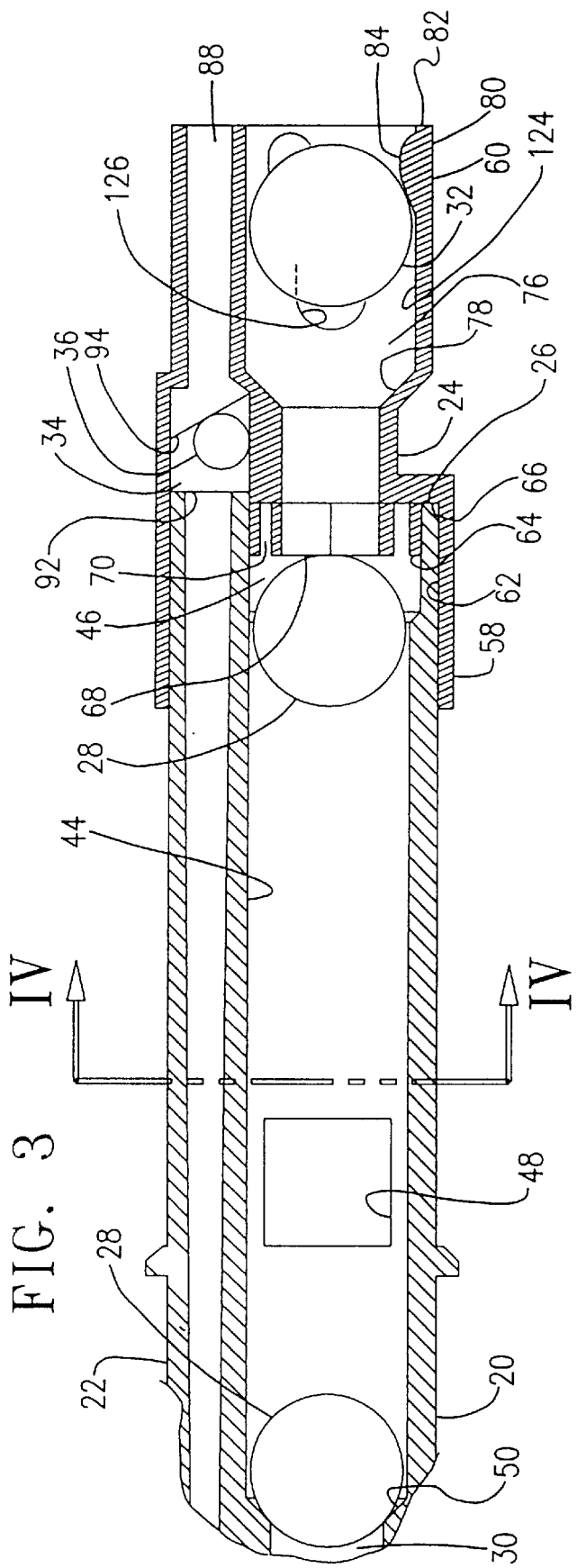
FIG. 3 is a section through lines III—III of FIG. 2.
Figure 4:
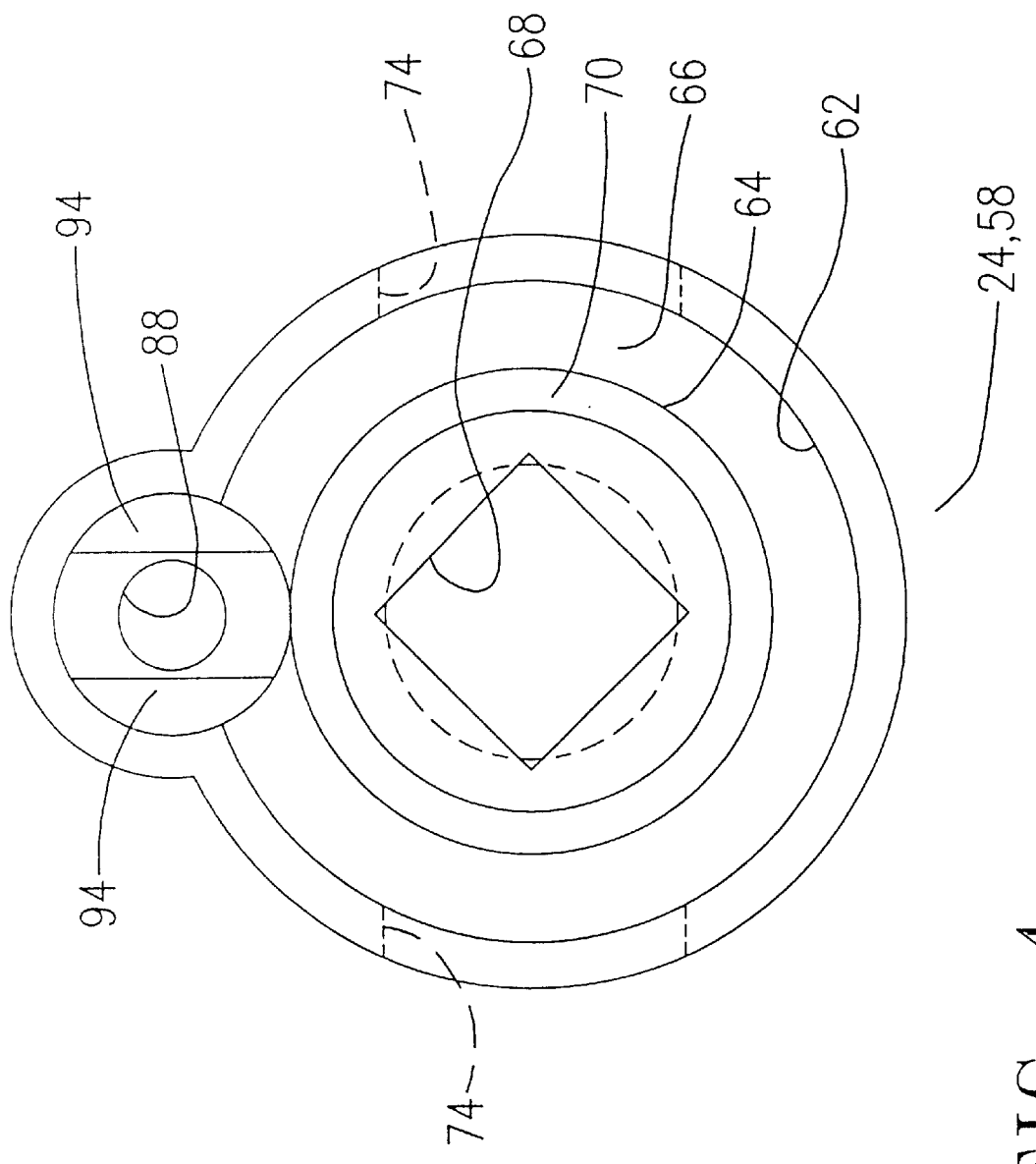
FIG. 4 is a frontal end view of the dump cap.
Figure 5:
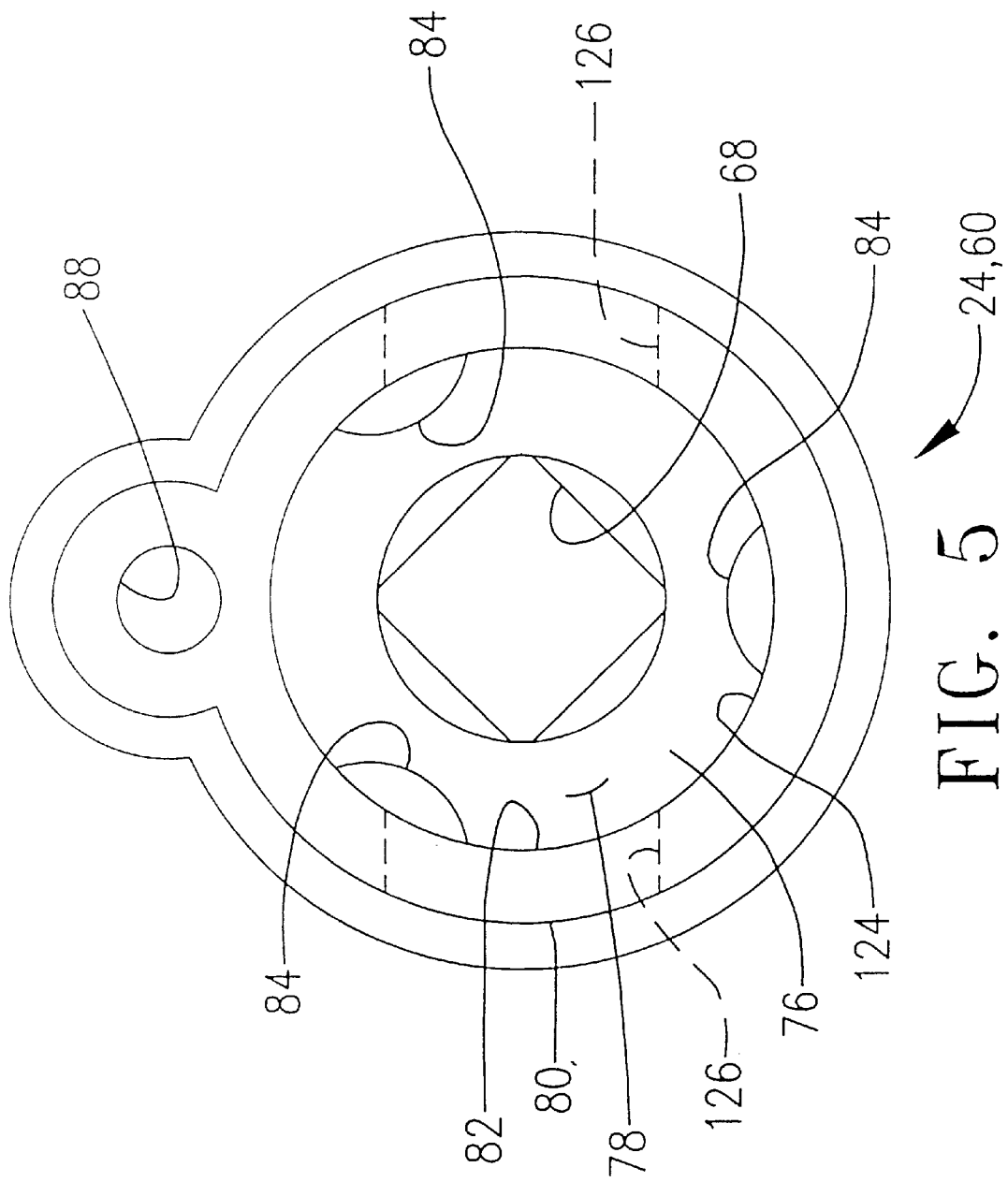
FIG. 5 is a back end view of the dump cap.

An important feature of this invention is embodied in the dump cap 24, shown in detail in FIGS. 2 & 3, having a front section 58 sealed and secured to the liquid inlet pipe 20, and a rear section 60 containing the control valve 32. The distal end 26 of the liquid inlet pipe 20 and the air pipe 22 is precisely sized. The dump cap front section 58 has a front outer tubular section 62 having a precisely sized internal surface which is a light press fit upon the distal end 26. The front section of dump cap 58 also has a shorter internal tubular section 64 which is precisely fitted to provide a light press fit into the distal end valve pocket 46. While the body 14 is of relatively hard and rigid plastic, the entire dump cap 24 is of a different, softer and relatively pliable plastic, such as high density polypropylene which enables the dump cap 24 to pliably conform to the body 14. The distal end 26 is pressed into and bottomed out in an annular receptor 66 between the tubular sections 62, 64. Inside the front section of dump cap 58 is a non-round, in this case square, valve support 68 upon which the shut-off valve 28 normally rests. Between the valve support 68 and the internal tubular section 64 is a liquid sump 70 for wetting and priming liquid inside of the valve pocket 46. On the outside of the inlet pipe distal end 26 is an opposed press of retainer abutments 72 having angled entry cams over which the pliant dump cap outer tubular section 62 can be pressed, until bottoming out in the annular receptor 66 whereupon the retainer abutments 72 snap into a pair of complementary retainer acceptors 74, whereupon the dump cap 24 is permanently sealed and secured to the body 14.

In the dump cap rear section 60 is a control valve chamber 76 containing the function control valve 32. There are two significant improvements here, the first being a frustro-conical control valve seat 78 having an included angle of less than ninety (90°) degrees, specifically an included angle in the range of forty to sixty (40° to 60°) degrees has been found to immediately seat the control valve 32 and prevent it from rolling around on the seat. Secondly, the rear section has a new control valve retainer 80 wherein the retainer 80 has the rear distal end of the dump cap 24 is a complete circumferential ring 82 within which is a plurality of inward projecting valve retainer abutments 84 through which the function control valve 32 is pressed. In between the control valve seat 78 and the shutoff valve support 68, is the portion control aperture 86.

FIG. 3 best illustrates the air pressure control valve 36 inside of the air valve chamber 34. The dump cap 24 has a rear vent portion 88 of the air vent pipe 22. In the front of the rear vent portion 88 is an expanded diameter forming the air valve chamber 36, and into which an extended air pipe distal end 90 is telescoped, and press fitted and fluid tightly sealed. The air pipe distal end 90 has a rearward facing air valve seat 92 for the air control valve 36. The rearward or downward end of the air valve chamber 34 has at least one and preferably a pair of open air valve supports 94 which are ramped to bias the air control valve 36 downward during pouring and inward toward the liquid bore 30 during upright rest of the pourer 10.

The air control valve 36 is a precision ball of stainless steel, ceramic, or plastic. The air control valve 36 is always open when the pourer 10 is upright, and is normally closed when the pourer 10 is inverted into a pouring position.

Another important feature of this invention is the new cork 16 shown best in FIGS. 6 & 7. The cork 16 has the conventional tubular section 96 and seals 98. Atop the cork 16 is a new annular ring 100 that has an outer perimeter 102 that is larger than the spout outer perimeter 40. In the cork outer perimeter 102 is a forward facing spout gripping lip 104 which is normally slip-fitted on the spout perimeter 40. On an underside of the cork perimeter 102 is a continuous plurality of convex grasping knobs 106, which have an outer diameter larger than the spout perimeter 40 and larger than a neck of the bottle 12. The cork 16 is retained to the body 14 by a barb section 108 snapped over the cork retainer 56.

When the pourer 10 is installed in a bottle, the cork seals 98 are wetted and the cork perimeter 102 is grasped with three fingers while the palm pushes on the spout 38. What is new in both function and structure is that the cork 16 can now be turned as it is being inserted in the bottle 12 to reduce the force required to insert and connect the pourer 10.

Then, when extracting the pourer 10 from the bottle 12, the cork 16 is grasped directly either with 3 fingers or with a wrap of the thumb and first finger, and the entire pourer 10 is extracted by pulling and turning directly upon the cork 16, rather than on the spout 38 as in the prior art. The lip 104 compresses inward against the spout perimeter 40 and the entire pourer 10 with its cork 16 can now be rotated in the bottle 12 during extraction which significantly reduces the force required to pull out the pourer 10. No more broken off spouts 38, and fewer broken/cracked fingernails.

FIGS. 8–10 illustrate a further important improvement in the pourer 10, wherein the pourer 10 is provided with a collar 18, and a collar cork 16A. The collar 18 is from the exterior conventional and covers the bottle outlet, specifically the threads and security seal. Inside the collar 18, which is a relatively rigid plastic component, is an inward facing radial spline 110 around the entire inside of the collar 18. The cork annular ring 100A has a peripheral spline 112 that is connected to and engaged to the collar spline 110. Now, during insertion and/or removal of the pourer 10 with the collar 18, the cork 16A can be rotated in the bottle by turning the collar 18, which significantly relieves the force needed to insert or to extract the pourer 10. Note that the rigid collar 18 has acute teeth 114 while the soft and pliable cork 16A has obtuse teeth 116 for preventing deformation of the teeth.

Note than either the cork 16 per se, or the cork 16A and collar 18 combination will work on any pourer 10, be it of the portion-control type having the dump cap 24 as shown, or a free pour type without a dump cap 24, or an electronic pourer as shown in my U.S. Pat. No. 5,255,819.

One of the distinguishing features of the pourer 10 of this invention, in that the dump cap 24 is permanently assembled and sealed to the body 14 without solvents, adhesives, sealants, or welding. It is ideally suited for robotic and/or low-skill manual assembly, with extremely high quality and reliability. The dump cap 24 is no longer susceptible to stress cracking from alcohol and chemicals in beverages, and is no longer susceptible to failing and dropping the control valve 32 out of the pourer 10.

The new spout flap 118 shown only in FIG. 1, is pivotally secured to the spout 38 by a hinge pin 120. The flap 118 is provided with a thumb actuator 122 that is engageable by a user's thumb and enables manual opening of the flap 118 during inversion of the pourer 10.

In the use and operation of the pourer 10, it is normally in a bottle 12 sitting upright on a support surface. As the pourer sits, control valve 32 rests upon the retainer abutments 84 and valve seat 78 is open for drainage of liquid out of the pourer 10 and back into the bottle 12. After the pourer 10 has drained empty, the sump 70 retains a quantity of priming and wetting liquid in the underside of the valve pocket 46. The air control valve 36 is open and is supported by the open air valve supports 94.

When the connected bottle 12 and pourer 10 are picked up and inverted, the control valve 32 moves into and closes the control valve seat 78. The air control valve 36 moves into and closes the air valve seat 92. The sump 70 drops its liquid onto the shut-off valve 28 sealing it to the liquid bore 30. Whereupon the shut-off valve 78 is held up by a partial vacuum in the valve pocket 46. Controlled flow of liquid into the liquid bore 30 through the portion control aperture 86 controls the rate and time of the fall of the shut-off valve 28, until the liquid ports 48 are reached, whereupon the shut-off valve 28 falls upon its seat 50 and the pour is terminated. The bottle 12 and pourer 10 are then turned upright to drain and reset the valves 28, 32. During pouring of liquid from the bottle 12, air pressure inside the bottle 12 drops and eventually a pressure differential sufficient to lift the air control valve 36 off its seat 78 is reached. The air control valve 36 opens and closes repetitively to control the pressure in the bottle 12, at a predetermined and constant partial pressure for an even flow rate of pours.

It has been found that with the new reduced angle in the control valve seat 78, the pourer 10 now needs to be inverted past horizontal only one-half of the include angle, to be positively operable, rather that the forty-five (45°) degrees required by the prior embodiments.

Further, it has been found that the cork per se, and the combination of the new cork and collar, and the new dump cap per se, are each an invention including patentable utility individually usable on pourer of all/most types.

Many other advantages and values may be found and realized, and various modifications will be suggested by those versed and working in the art, but be it understood that I embody within the scope of the patent hereon, all such embodiments as reasonably and properly come within the scope of my contribution to the art and industry.

What is claimed is:

1. A method of installing and extracting a liquid pourer to and from a liquid bottle, comprising the steps of:
    a) providing a relatively rigid plastic pourer body having a pouring spout, an inlet pipe, a liquid bore through said spout and said pipe, and a gripping surface;
    b) securing a relatively soft and pliable tubular plastic sealing cork to said body; and providing said cork with an annular flange having a lip at a peripheral surface that overlaps said gripping surface;
    c) pushing said cork and body together into the throat of a liquid bottle, and subsequently;
    d) extracting said cork and body from the bottle by grasping and squeezing said lip against said gripping surface to increase the frictional engagement between the cork and body and pulling on said body and said cork.

2. A method of inserting and extracting a liquid pourer to and from a liquid bottle, comprising the steps of
    a) providing a relatively rigid plastic pourer body having a pouring spout, an inlet pipe, and a liquid bore through said spout and said pipe;
    b) slipping a relatively rigid collar onto said inlet pipe and up against a backside of said pouring spout, said collar being freely rotatable with respect to said body;
    c) securing a relatively soft and pliable tubular plastic sealing cork to said body, and providing said cork with an annular flange;
    d) holding said collar adjacent the backside of the pouring spout with said cork annular flange;
    e) providing interconnecting positive radial engagement between an underside of said collar and said cork annular flange; and
    f) inserting and/or extracting the pourer from the bottle by grasping the collar and turning the cork there within the bottle, while either pushing the pourer into the bottle or pulling the head out of the bottle.

3. A method of providing a liquid pourer for pouring liquid from an inverted bottle, comprising the steps of
    a) providing a relatively rigid plastic pourer body, said body having a pouring spout, and inlet pipe, a rearward facing distal end on said inlet pipe, and forward facing retainers on said distal end;
    b) providing a plastic dump cap which is softer than and relatively pliable with respect to said body, with mechanical sealing means for fluid tight sealing engagement with said distal end, and with retainer acceptors for accepting said retainers;
    c) placing a shut-off valve in said inlet pipe; and
    d) pushing said dump cap onto said distal end, and pliantly sealing said dump cap to said distal end, and then pliantly engaging said retainers and said retainer acceptors and thereby mechanically locking said dump cap to said body in a fluid tightly sealed assembly, without solvent, adhesives, sealant, or welding.

4. The method of claim 3 including the steps of
    a) securing a relatively soft and pliable tubular plastic sealing cork to said body; and
    b) providing said cork with an annular flange having a lip at a peripheral surface that overlaps said gripping surface.

5. The method of claim 3, including the further steps of providing said retainers as radial dogs on an outer diameter of said inlet pipe, and providing said retainer acceptors as dog receiving apertures in said dump cap.

6. The method of claim 3, including the further steps of pliably sealing the dump cap to and against an outer diameter of said inlet pipe, to an inner diameter of said inlet pipe, and to an outer annular face on said distal end of said inlet pipe.

7. The method of claim 3, including the further steps of providing a front portion of an air pipe in said body, providing a rear portion of an air pipe in said dump cap, and pliantly sealing the air pipe portions together without solvent, adhesive, sealant or welding.

8. The method of claim 7 wherein a valve chamber is defined in a bore of the rear portion of said air pipe between a valve seat and a valve support and wherein a ball valve is mounted in said valve chamber.

9. The method of claim 8 wherein said dump cap comprises a tubular dump body having a dump bore in flow communication with said inlet pipe, wherein said dump bore includes a valve seat and a second ball valve for controlling flow of liquid in said distal end, wherein a window aperture aft of said valve seat communicates through a side wall of the dump body with said dump bore along a region of movement of the second ball valve, wherein retainer means retain said second ball valve within said dump bore.

10. The method of claim 3 wherein said dump cap comprises a tubular dump body having a dump bore in flow communication with said inlet pipe, wherein said dump bore includes a valve seat and a ball valve for controlling flow of liquid in said distal end, wherein a window aperture aft of said valve seat communicates through a side wall of the dump body with said dump bore along a region of movement of the ball valve, wherein retainer means retain said ball valve within said dump bore.

11. The method of claim 3 including the steps of
    a) slipping a relatively rigid collar onto said inlet pipe and up against a backside of said pouring spout, said collar being freely rotatable with respect to said body;
    b) securing a relatively soft and pliable tubular plastic sealing cork to said body and providing said cork with an annular flange
    c) holding said collar adjacent the backside of the pouring spout with said cork annular flange; and
    e) providing interconnecting positive radial engagement between an underside of said collar and said cork annular flange.

* * * * *